United States Patent [19]

Farley

[11] 3,986,412
[45] Oct. 19, 1976

[54] REDUNDANT MOTOR REDUCER DRIVE
[75] Inventor: Wilbur H. Farley, Beverly, Mass.
[73] Assignee: USM Corporation, Boston, Mass.
[22] Filed: June 12, 1975
[21] Appl. No.: 586,394

Related U.S. Application Data
[63] Continuation of Ser. No. 442,232, Feb. 13, 1974, abandoned.

[52] U.S. Cl. .................................... 74/661; 74/675
[51] Int. Cl.² ........................................ F16H 37/06
[58] Field of Search ............ 74/640, 675, 804, 813, 74/661; 310/122, 112, 118

[56] References Cited
UNITED STATES PATENTS

| 3,214,999 | 11/1965 | Lapp | 74/640 X |
|---|---|---|---|
| 3,326,060 | 6/1967 | Rasmussen | 74/675 |
| 3,558,944 | 1/1971 | Verge | 74/804 X |
| 3,604,287 | 9/1971 | Humphreys | 74/640 |

FOREIGN PATENTS OR APPLICATIONS

| 624,911 | 8/1961 | Canada | 74/640 |
| 214,258 | 3/1968 | U.S.S.R. | 74/640 |

OTHER PUBLICATIONS
Musser, C. W. "The Harmonic Drive", *Design*, The Penton Publishing Co., Cleveland, Ohio 1960.

*Primary Examiner*—Samuel Scott
*Assistant Examiner*—Frank H. McKenzie, Jr.
*Attorney, Agent, or Firm*—Richard B. Megley; Vincent A. White; Donald N. Halgren

[57] ABSTRACT

A compact in-line dual motor arrangement provides a redundant drive system wherein the respective motors are coupled to planetary gear reducers, each preferably of the dual harmonic drive type. The construction is such that in one stage a first drive motor and one of its two circular splines are connected to a stationary housing, and the second output circular spline is integral with a first circular spline of the second stage. The second circular spline of the second stage transmission together with the second drive motor are connected to an output member.

1 Claim, 3 Drawing Figures

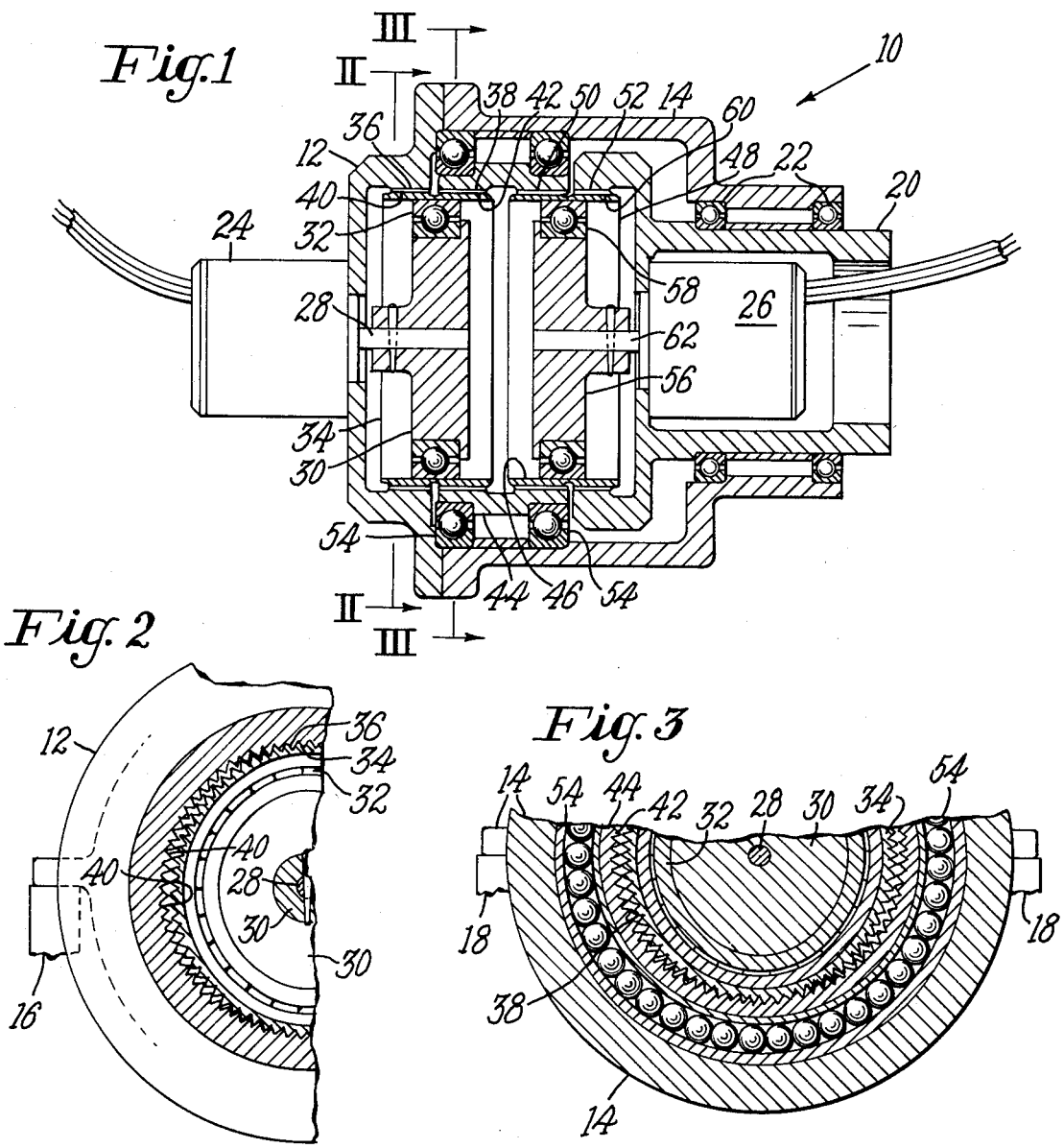

REDUNDANT MOTOR REDUCER DRIVE

This is a continuation of application Ser. No. 442,232, filed Feb. 13, 1974 now abandoned.

BACKGROUND OF THE INVENTION

This invention relates to redundant driving mechanism, i.e. to an actuator inherently having unusually high assurance of performance. Redundant drive arrangements are somtimes required or found desireable in critical operating situations on earth, and are depended upon, perhaps to an even greater degree, in the case of functions to be performed in adverse environments, for instance in outer-space. Specifically, a reduntant acuator is one which may reliably be expected to perform in at least one of two alternative modes, one of which is usually relied on for regular operation and the other constituting a standby, i.e. one which primarily functions in an emergency such as failure in the first mode.

In many instances it is important in a redundant drive arrangement to be able to transmit power with a compact assembly that is not unusually heavy or complex despite the presence of some ordinarily superfluous mechanism. The present invention accordingly takes note of the advantages residing in harmonic drive planetary gearing as basically disclosed, for example, in U.S. Pat. No. 2,906,143. More especially the present invention advantageously incorporates in novel combination the space-saving and speed-changing features embodied in a so-called "Dual Strain Wave Gearing" of the single stage type disclosed in U.S. Pat. No. 2,943,513, issued July 5, 1960, on an application filed in the name of C. W. Musser.

SUMMARY OF THE INVENTION

In view of the foregoing, it is a primary object of this invention to provide an improved, redundant motor-reducer transmission assembly.

In accordance with this object, a feature of the invention resides in the combination of two dual harmonic drive gearing stages connected in series, a motor connected coaxialy to these stages, respectively, and reaction or anchoring means connected to the respective motors, one of the motors being secured to a stationary housing, and the other motor reacting torque to the housing through one of the gearing stages.

While it may be practicable in some situations to employ more conventional planetary gearing arrangements in coupled stages, features of harmonic drive reducers including compactness, coaxial alignment, and low backlash are commonly found advantageous. The harmonic drive stages may be of different reduction ratios and driven by similar or different types of motors.

BRIEF DESCRIPTION OF DRAWINGS

The foregoing and other features of the invention will now be more particularly described in connection with an illustrative embodiment, and with reference to the accompanying drawings, in which:

FIG. 1 is a view largely in axial section of a redundant motor-reducer transmission.

FIG. 2 is a section taken on the major axis II—II of FIG. 1, and

FIG. 3 is a partial section taken on the major axis line III—III of FIG. 1.

DESCRIPTION OF THE PREFERRED EMBODIMENT

Referring to FIG. 1, a redundant transmission assembly generally designated 10 comprises a housing consisting of coaxial complemental parts 12, 14. The housing is held against rotation as by abutment of the part 12 with a stationary member 16 (FIG. 2), and by abutment of the part 14 with a stationary member 18 (FIG. 3).

A rotary output member in the form of a tubular shaft 20 (FIG. 1) is journaled in the housing 14 by bearings 22,22. As will hereinafter be described, input for driving the shaft 20 through coupled planetary speed changing assemblies is optionally accomplished by means of either of two motors 24,26. Leads from the first motor 24 may extend to a fixed connector, but leads of the second motor 26 extend to a slip ring assembly. Electric current is automatically shifted from a failing energy source of one of these motors to energize the other motor by control mechanism not herein shown. It will be understood that various well-known means are available for thus shifting energy supply, and they may for example employ a solenoid or other device responsive to change in current. The stator and frame of the motor 24 are secured to the housing part 12, and the stator and frame of the motor 26 are secured to the rotary output member 20.

The rotor (not shown) of the motor 24 is coupled to a first stage planetary gear reducer by a motor drive shaft 28 connected to a harmonic drive wave generator comprised of a so-called "plug" or lobar cam 30 and a ball bearing 32. The cam 30, for simplicity, is shown as ellipitoidal but will be understood that other lobar shape may be employed if desired. As hitherto disclosed, the function of the wave generator is to produce and progress a continuous wave of radial deflection circumferentially in a flex spline 34. In this case, assuming dual strain wave gearing reduction as taught in the above-cited U.S. Pat. No. 2,943,513, the flex spline 34 is formed with spaced sets of external spline teeth 36,38, the teeth 36 meshing at major axis localities as shown in FIG. 2 with internal stationary spline teeth 40 formed on the housing part 12. The teeth 38 mesh with internal spline teeth 42 formed on a left hand end of a rigid coupling 44 (FIGS. 1 and 3) interconnecting coaxially the first and second stages of planetary gear reducers as will be explained.

It will be understood that the flexspline teeth 38 and the coupling teeth 42 may be equal in number when the so-called "dynamic spline" arrangement of the U.S. Pat. No. 2,959,065 is employed for relatively low reduction capability ratios, and that a tooth differential equal to the number of wave generator lobes (or multiple thereof) may be employed in the spline sets 36, 40. In providing a greater reduction capability ratio, (for instance more than 160;1) the teeth sets 34, 42 may have a differential such as two (or a multiple of the number of lobes); a specific example is indicated below. Incidentally, it will be apparent that over-all reduction ratio of the assembly being described is not limited by the particular harmonic drive incorporated since the drive motors may include spur gear heads (not shown) as pre-stage gearing.

From the foregoing it will be clear that the rotating wave shape of the first stage flexspline 34 rotates the coupling 44 and hence a set of right-hand internal coupling teeth 46 (FIGS. 1 and 3) provide input to a second stage of reducer gearing next to be described, which may differ from or be substantially identical to the first stage. A dual flexspline 48 of this second stage is formed with an external set of spline teeth 50 meshing at major axis localities with the teeth 46, and a second set of teeth 52. The coupling 44 is preferably journaled in bearings 54, 54 as shown in FIG. 1. The radial deflection of the flexspline 48 and its circumferential transmission of wave shape is derived from a second-stage lobar wave generator comprised of a cam 56 and surrounding bearing 58. The second stage reducer has its flexspline teeth 52 meshing, at circumferentially spaced localities with internal splined teeth 60 formed on an inner end of the output shaft 20. It will accordingly be understood that when the motor 24 is operative to drive the assembly 10, the frame and stator of the motor 26 are rotatably driven with the output shaft 20. The second stage is now passive or in a 1:1 mode like a coupling. No relative motion of the second stage wave generator 56, 58, which is connected by a drive shaft 22 to the rotor of the motor 26, occurs by reason of the combined wave generator starting torque and the detent torque of the motor 26. Thus, the second stage reducer acts as a solid coupling along with the rigid coupling 44 between the first stage and the output shaft 20.

Considering now the situation when the motor 24 or its source of energy has failed, the motor 26 thereupon becomes energized through its slip ring connection to do the driving of the output shaft 20. This is accomplished by rotatably driving the wave generator 56, 58 through the motor shaft 62, and hence driving the shaft 20 through the second stage flexspline teeth 52, the reaction torque to the actuator housing now be exerted through the coupling 44 and the first stage reducer, i.e. the first stage flexspline 34 or more particularly the meshing of teeth sets 36 and 40. The first stage wave generator 34 is then stationary by reason of the combined wave generator starting torque and the detent torque of the inoperative motor 24. In other words, the first stage is now passive, i.e. acting as a coupling.

In either of the alternative modes of operation of the redundant drive assembly 10, it is thus clear that, of the coupled pair of dual or dynamic harmonic drive reducers, a set of teeth of one of the two dual flexsplines is held stationary, and the other of the two dual flexsplines becomes the output element.

Merely by way of providing a specific example of the over-all reduction attained in one illustrative redundant drive assembly accordingly to this invention, if the following sets of teeth are assumed in the numbers indicated:

First stage flexspline teeth 36 = 170 in number;
Circular spline teeth 40 = 172 in number;
Flexspline teeth 38 = 166 in number;
Circular spline teeth 42 = 168 in number; and
In the second stage, flexspline teeth 50 = 170 in number;
Circular spline teeth 46 = 172 in number;
Flexspline teeth 52 = 166 in number;
Circular spline teeth 60 = 168 in number;
Then the ratio of the first stage becomes:

$$\frac{(85) \times (84)}{85 - 84 + 1}$$

or 3,570:1 when the motor 24 drives the shaft 20; and alternatively the ratio of the second stage likewise becomes 3,570:1 when the motor 26 does the driving. It will be understood that, though the ratios of both stages are the same in the example, they need not be.

I claim:
1. A redundant flexspline harmonic drive transmission assembly comprising a first and a second arrangement of coaxially spaced apart alternatively energizable driving motors, either one of which is utilizable for driving an output shaft, the second of which is passive until the failure of said first motor, whereupon said second motor will drive said output shaft, a pair of spaced, harmonic drive gear reducers disposed between the motors, a stationary housing enclosing at least said harmonic drive gear reducers and holding the stator of the first of said motors against rotation, each of the harmonic drive gear reducers being drivingly coupled to the adjacent rotor of one of said motors, an output member of one of said harmonic drive gear reducers being directly connected to a member of the other of said harmonic drive gear reducers, and another member of said other harmonic drive gear reducer being coupled together with the stator of said other motor to the output shaft, said second motor being coaxially disposed within said output shaft to permit said redundant harmonic drive transmission assembly to be compact, lightweight and efficient.

* * * * *